US009523835B2

(12) United States Patent
Sekiguchi

(10) Patent No.: US 9,523,835 B2
(45) Date of Patent: Dec. 20, 2016

(54) LENS DRIVING DEVICE, CAMERA DEVICE, ELECTRONIC APPARATUS, AND MANUFACTURING METHOD FOR LENS DRIVING DEVICE

(71) Applicant: New Shicoh Technology Co., Ltd., Kanagawa (JP)

(72) Inventor: Naoki Sekiguchi, Kanagawa (JP)

(73) Assignee: New Shicoh Technology Co., Ltd., Kanagawa (JP)

(*) Notice: Subject to any disclaimer, the term of this patent is extended or adjusted under 35 U.S.C. 154(b) by 0 days.

(21) Appl. No.: 14/678,010

(22) Filed: Apr. 3, 2015

(65) Prior Publication Data
US 2015/0319346 A1    Nov. 5, 2015

(30) Foreign Application Priority Data
Apr. 30, 2014   (JP) ................. 2014-093504

(51) Int. Cl.
*G02B 7/08*     (2006.01)
*H04N 5/225*    (2006.01)
*G02B 7/02*     (2006.01)
*G02B 7/09*     (2006.01)
*G02B 13/00*    (2006.01)

(52) U.S. Cl.
CPC .............. *G02B 7/08* (2013.01); *G02B 7/026* (2013.01); *G02B 7/09* (2013.01); *H04N 5/2254* (2013.01); *H04N 5/2257* (2013.01); *G02B 13/001* (2013.01)

(58) Field of Classification Search
CPC .... H04N 5/2254; H04N 5/2257; G02B 7/026; G02B 7/09
See application file for complete search history.

(56) References Cited

U.S. PATENT DOCUMENTS

2006/0181748 A1*  8/2006  Makii ................ G02B 7/026
                                                      358/500
2008/0247063 A1* 10/2008  Otsuki ................ G02B 7/04
                                                      359/824

(Continued)

FOREIGN PATENT DOCUMENTS

JP      2009-282090    12/2009
JP         3186519      9/2013

OTHER PUBLICATIONS

English language machine translation of JP3186519.
English language abstract of JP2009-282090.

*Primary Examiner* — Jason Flohre
(74) *Attorney, Agent, or Firm* — Fildes & Outland, P.C.

(57) ABSTRACT

A lens driving device including: a lens holder; a coil mounted on the lens holder; at least one magnet disposed around the coil; a first and second spring members which support the lens holder at the both sides thereof in the optical axis direction so that the lens holder can move freely in the both directions of the optical axis of the lens in an initial state of no electric current to the coil; and an abutment surface to which the lens holder abuts when the lens holder moves toward one spring member against a biasing force of the one spring member; wherein the lens holder is exhorted a biasing force by the other spring member from the side of the other spring member to the side of the one spring member in the optical axis direction when the lens holder abuts against the abutment surface. Thus the lens driving device can support a lens holder in a stable fashion.

10 Claims, 4 Drawing Sheets

(56) References Cited

U.S. PATENT DOCUMENTS

2010/0110270 A1\* 5/2010 Sekimoto ............. H04N 5/2254
348/340
2011/0262121 A1\* 10/2011 Yanagisawa ............. G02B 7/08
396/55

\* cited by examiner

LENS DRIVING DEVICE, CAMERA DEVICE, ELECTRONIC APPARATUS, AND MANUFACTURING METHOD FOR LENS DRIVING DEVICE

CROSS-REFERENCE TO RELATED APPLICATIONS

The present application claims the benefit of Japanese Patent Application No. 2014-093504 filed on Apr. 30, 2014, which is incorporated herein by reference in its entirety.

TECHNICAL FIELD

This invention relates to a lens driving device, a camera device, an electronic apparatus, and a manufacturing method for the lens driving device.

BACKGROUND ART

Electronic apparatuses such as cellular phones and smart phones are equipped with a miniaturized camera. The miniaturized camera of this type is an automatic focusing type. The miniaturized camera of this automatic focusing type includes a lens driving device for actuating the lens to move.

Japanese Registered Utility Model No. 3186519,U discloses a lens driving device that includes: a tubular lens holder being capable of holding a lens member which is disposed above an imaging sensor; a biasing member supporting the lens holder so that the lens holder can move along the optical axis direction; a fixing member for fixing one part of the biasing member; and a driving mechanism having magnets, a coil, and a yoke and which driving mechanism moves the lens holder along the optical axis; wherein the biasing member includes an upper sheet spring fixed to the top of the lens holder and a lower sheet spring disposed opposing to the upper sheet spring and fixed at the bottom of the lens holder; the fixing member is provided with a first abutment reception to which a first abutment part being provided at the upper part of the lens holder can abut and a second abutment reception to which a second abutment part being provided at the bottom part of the lens holder can abut; and wherein in an initial state in which the lens holder is oriented into the horizontal direction whose optical axis is orthogonal to the vertical direction and in which no electric current flows through the coil, the distance between the first abutment part and the first abutment reception is set to be larger than the distance between the second abutment part and the second abutment reception.

Japanese Patent Application Laid-Open Publication No. JP2009-282090,A discloses a lens driving device including: a tubular lens body including a lens; a driving coil fixedly disposed around the lens body; permanent magnets disposed opposing to the driving coil; an outer yoke to which the permanent magnets are disposed at its inner wall; and an upper elastic member and a lower elastic member disposed at upper and lower sides of the lens body and supporting the lens body so that the lens body can move along the optical axis without moving in the radial direction of the lens body; wherein each of the upper elastic member and the lower elastic member has an inner circumference side end which is attached to the lens body and an outer circumference side end which is attached to the outer yoke; the position of the lens body is adjustable along the optical axis direction by an interaction of a magnetic field of the permanent magnets with a magnetic field of an electric current flowing through the coil when the electric current flows through the coil; and wherein when no electric current flows through the coil, the lens body is positioned in a focus adjustable region of the lens body along the optical axis direction except an infinity focus position and a macro focus position.

SUMMARY

In the inventions disclosed by the above prior art documents, the lens holder supporting the lens is supported by the spring members at both sides of the lens holder in a manner that the lens as well as the lens holder can move toward both directions of the optical axis of the lens at the initial state of no electric current flowing through the coil.

However, in the above prior art, the spring members need to be fixed with the lens holder under the suspended condition during the assembling process of the lens driving devices; thus the balance of the lens holder is unstable and this leads to generate an assembling failure of the lens holder being slantly assembled to the device with regard to the optical axis of the lens.

This invention aims to provide a lens driving device which can support a lens holder in a stable fashion, a camera device, an electronic apparatus, and a manufacturing method for the lens driving device.

According to one embodiment of the present invention, the lens driving device includes: a lens holder for supporting a lens; a coil mounted on the lens holder; at least one magnet disposed around the coil; a first spring member and a second spring member which support the lens holder at the both sides of the lens holder in the optical axis direction of the lens so that the lens holder can move freely in the optical axis direction in an initial state in which no electric current flows through the coil; and an abutment surface to which the lens holder abuts when the lens holder moves toward one of the first and second spring members against biasing force of the one of the first and second spring members; wherein the lens holder is exhorted a biasing force by the other one of the first and second spring members from the side of the other one of the first and second spring members to the side of the one of the first and second spring members in the optical axis direction when the lens holder abuts against the abutment surface.

Preferably, each of the first spring member and the second spring member includes: a spring body portion to be fixed on a peripheral portion around the lens holder; a support portion to be fixed to the lens holder; and a connecting portion connecting the spring body portion with the support portion; wherein the difference of the distance from the spring body portion to the support portion of the other one of the first and second spring members and the distance from the abutment surface to the lens holder in the initial state in which no electric current flows through the coil is larger than the distance of the spring body portion to the support portion of the other one of the first and second spring members in a non-biased state.

Preferably, the spring body portion and the support portion of the other one of the first and second spring members are positioned on the same plane in the non-biased state, the distance between the lens holder and the abutment surface is smaller than the distance between the spring body portion and the support portion in the initial state in which no electric current flows through the coil.

Preferably, each of the first spring member and the second spring member further includes: a spring body portion to be fixed on a peripheral portion around the lens holder; a support portion to be fixed to the lens holder; and a connecting portion connecting the spring body portion with the support portion; wherein the distance from the spring body portion to the support portion of the other one of the first and second spring members in the state in which the lens holder abuts against the abutment surface is larger than the distance from the spring body portion to the support portion of the other one of the first and second spring members in a non-biased state.

Preferably, the spring body portion and the support portion of the other one of the first and second spring members are positioned on the same plane in the non-biased state while the support portion is positioned at a side being directed toward the other one of the first and second spring members in the optical axis direction with regard to the main body portion in the state in which the lens holder abuts against the abutment surface.

According to another aspect of the present invention, a camera device includes: a lens driving device of the above aspect of the invention; a lens held by the lens holder; and an image sensor being provided about the optical axis of the lens.

According to other aspect of the present invention, an electronic apparatus is equipped with the camera device of the above aspects.

According to other aspect of the present invention, a method for manufacturing a lens driving device includes: fixing a first spring member which supports a lens holder, which holds a lens, at one side of the lens holder in the optical axis direction of the lens; making the lens holder abut to an abutment surface against biasing a force of the first spring member; and in the state in which the lens holder abuts to the abutment surface against the biasing force of the first spring member, fixing a second spring member, which supports the lens holder at the other side of the lens holder in the optical axis direction of the lens, to the lens holder with the second spring member being exhorted a biasing force from the other side of the lens holder.

Preferably, the lens driving device includes: a coil mounted on the lens holder; and at least one magnet disposed around the coil; wherein the lens holder abuts against the abutment surface by flowing an electric current through the coil.

The abutment of the lens holder against the abutment surface also can be carried out by pressing the lens holder.

According to the present invention, the lens driving device in which the lens holder is supported by the spring members at the both sides of the lens holder in the optical axis direction of the lens so that the lens holder can move freely in the optical axis direction in the initial state in which no electric current flows through the coil is provided with the abutment surface to which the lens holder abuts and is configured so that the lens holder is exhorted a biasing force by the spring member with the state in which the lens holder abuts against the abutment surface when the spring member is assembled. Thus, the spring member can be attached to the lens holder in a stable fashion, and as a result, the lens holder can be stably supported.

DETAILED DESCRIPTION OF PREFERRED EMBODIMENT OF THE INVENTION

Figure 1:
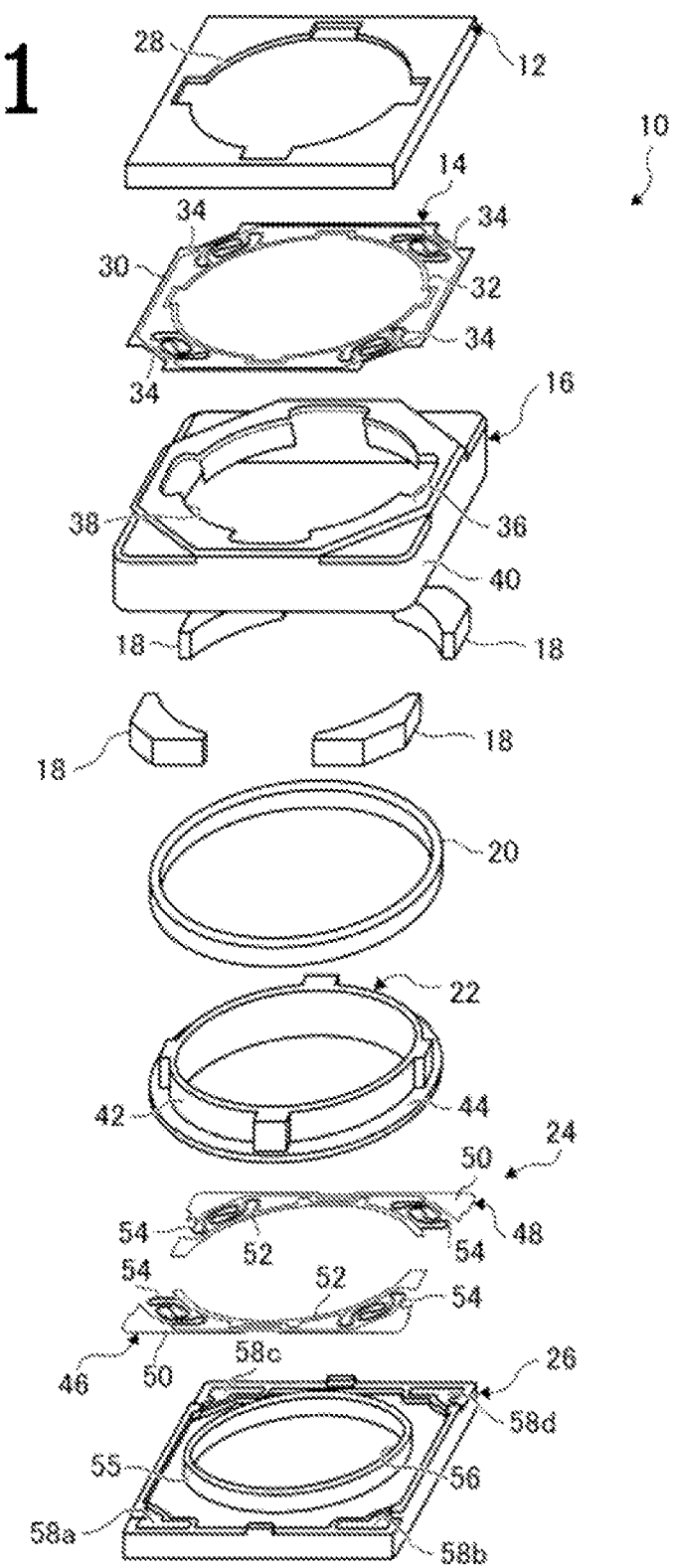
FIG. 1 is an exploded perspective view of the lens driving device according to one embodiment of the present invention.
Figure 2:
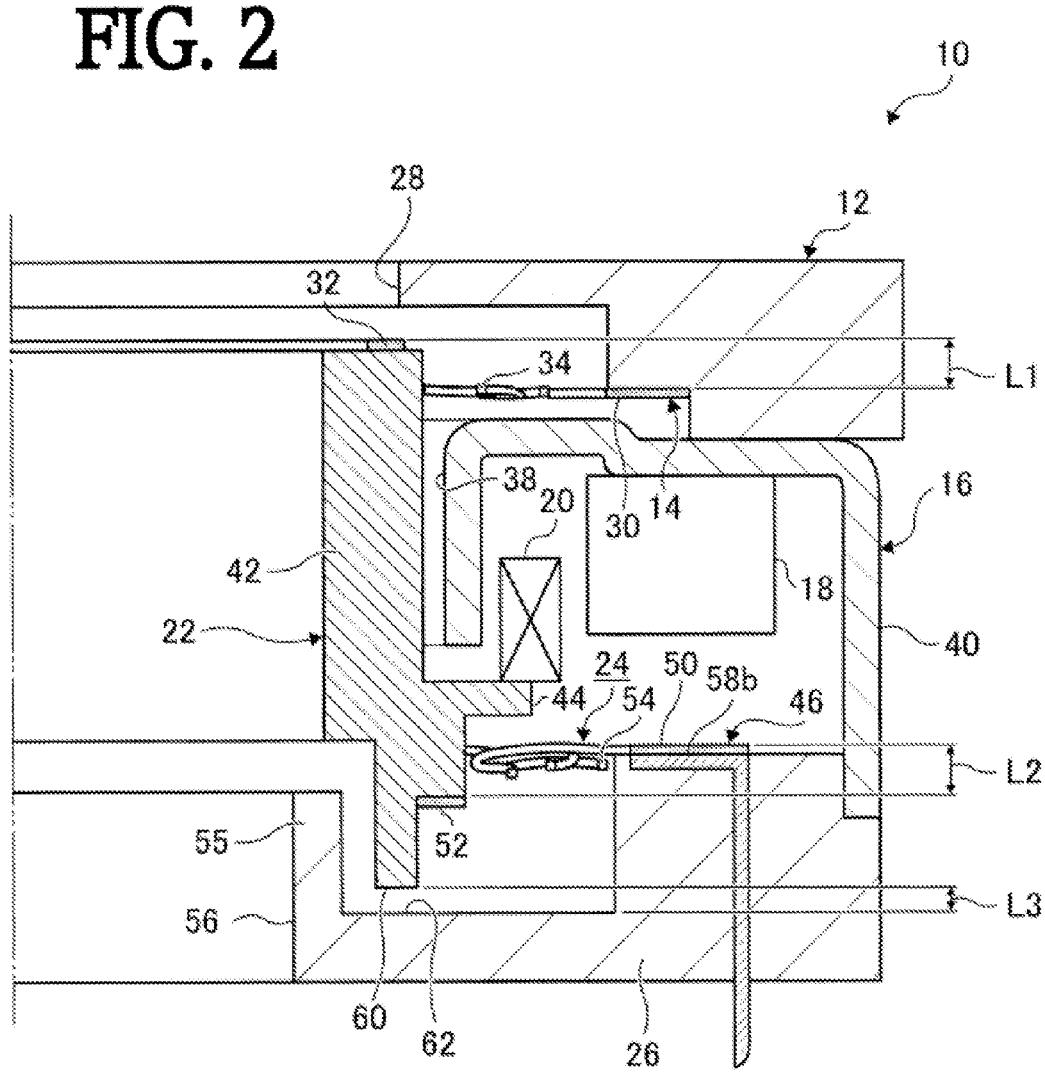
FIG. 2 is a cross-sectional view of the lens driving device according to one embodiment of the present invention.

One embodiment of the present invention is described with reference to the drawings. A lens driving device 10 shown in FIGS. 1 and 2 is used for a miniaturized camera of an automatic focusing type which is installed in an electronic apparatus such as a cellular phone and a smart phone. The lens driving device 10 includes: a frame 12, the upper spring member 14, a yoke 16, magnets 18, a coil 20, a lens holder 22, lower spring members 24, and a supporter 26 for the spring members 24.

It would be noted throughout this explanation that one direction along the optical axis of the lens driving device 10 is referred to as "downward direction", for convenience of explanation, while the opposite direction is referred to as "upward direction".

The frame 12 is formed in a rectangular shape viewing from the above, and is also has a circular first through-hole 28, through which the light passes.

The upper spring member (first spring member) 14 includes an upper spring body portion 30 formed so as to surround the upper spring member 14 itself at its outer circumference, an upper support portion 32 formed in a circular shape, and upper connecting portions 34 which connect the upper spring body portion 30 and the upper support portion 32. The upper connecting portions 34 are elastically deformable, especially in upward and downward directions. In the present embodiment, four upper connecting portions 34 are formed apart from each other with a predetermined interval and support the upper support portion 32 in a movable manner against the upper spring body portion 30. In this embodiment, the upper spring member 14 is formed so that the upper spring body portion 30, upper support portion 32, and the upper connecting portions 34 are all positioned in the same plane when the upper spring member 14 is in a non-biased state.

The yoke 16 is formed in a rectangular shape viewing from the above. The yoke 16 has a top wall 36 at its top. The yoke 16 is formed with a circular second through-hole 38 in the top wall 36 through which second though-hole 38 the light passes. The yoke 16 has side walls 40 formed so as to extend downward from each four sides of the yoke 16.

The upper spring member 14 is fixed on the yoke 16 by its upper spring body portion 30 being fixed in a mounting part which is convexed upward at the lower surface of the frame 12, and by the frame 12 being fixed onto the top wall 36 of the yoke 16. The top wall 36 of the yoke 16 is not obstacle to the movement of the upper connecting portions 34 when the upper support 32 of the upper spring member 14 moves downward.

The magnets 18 include, for example, four magnet pieces 18. Each magnet piece 18 has two outer planer side surfaces which are orthogonal to each other and an arc-shaped inner surface. The outer planer side surfaces are fixed inside of the side walls 40 of the yoke 16 at each of its four corners.

The coil 20 is formed as a circular-ring shape. The coil 20 is formed by winding a core wire made of metal such us copper. The outer peripheral surface of the coil 20 faces against the inner surfaces of the magnet pieces 18.

The lens holder 22 has a cylindrical holder body 42 and a coil fixing part 44 formed in a flanged shape and outwardly extended at the lower most end of the cylindrical holder body 42. The holder body 42 is formed with threads at its inner surface so that the lens (not shown) can be screwed and be fastened on the inside of the holder body 42. The coil 20 is fixed onto the coil fixing part 44. The upper support portion 32 of the upper spring member 14 is attached and fixed to the upper most end of the lens holder 22.

The lower spring members (second spring members) 24 include two members: a first lower spring member 46 and a second lower spring member 48. The first lower spring member 46 and the second lower spring member 48 each has a lower spring body portion 50 formed in an approximately linear shape, a lower support portion 52 formed in an arch-shape, and lower connecting portions 54 connecting the lower spring body portion 50 and the lower support portion 52. The lower connecting portions 54 are elastically deformable especially in the upward and downward direction, in which two lower connecting portions 54 are formed with a predetermined distance for the each first and second lower spring members 46, 48, and movably connect the lower support portion 52 against the lower spring body portion 50. In this embodiment, the first lower spring member 46 and the second lower spring member 48 are formed so that the each lower spring body portions 50, lower support portions 52, and lower connecting portions 54 are all positioned in the same plane when the first lower spring member 46 and the second lower spring member 48 are in the non-biased state.

The lower support portions 52 of the first lower spring member 46 and the second lower spring member 52 is attached and fixed to the lower most end of the lens holder 22. The lower support portion 52 of the first lower spring member 46 is electrically connected with one end of the core wire of the coil 20 while the lower support portion 52 of the second spring member 48 is electrically connected with the other end of the core wire of the coil 20.

The supporter 26 for the spring members is also a base for the lens driving device 10; and is formed in a rectangular shape viewing from the above. The supporter 26 has a circular third through-hole 56 through which the light passes. The third through-hole 56 is formed with a protrusion 55 being formed to protrude upward and all along the inner peripheral of the third through-hole 56 so as to reinforce the area including the third through-hole 56. Further, the supporter 26 is provided with joining members 58a-58d located apart from each other on the upper surface at the inside of the each four corners of the supporter 26. The joining members 58a-58d are formed as a planar shape and are located slightly inside from the outer peripheral sides of the supporter 26. As show in FIG. 1, two joining members 58a, 58b among the joining members 58a-58d are joined with the first lower spring member 46 while the other two joining members 58c, 58d are joined with the second lower spring member 48. Two joining members e.g. 58b, 58d, among the joining members 58a-58d, are used as terminals for being electrically connected with an external circuit and are folded in almost the right angle, as shown in FIG. 2, to extend and protrude downward from the under surface of the supporter 26. On the other hand, the other two joining members 58a, 58c are dummy terminals which are not electrically connected to the external circuit, and also do not extend and protrude flora the under surface of the supporter 26.

As shown in FIG. 2, the lens holder 22 is movably supported between the upper spring member 14 and the lower spring members 24 which include the first lower spring member 46 and second lower spring member 48 so as to move freely in the upward and the downward direction. The lens holder 22 is exhorted a downward biasing force by the upper spring member 14 and is exhorted an upward biasing force by the lower spring members 24. More precisely, the distance between the upper support portion 32 and the lower support portions 52 in the optical axis direction is larger than the distance between the upper spring body portion 30 and the lower spring body portions 50 in the optical axis direction. In this embodiment, the spring constant value of the upper spring member 14 and the spring constant value of the lower spring members 24 (the spring constant value of the resultant spring consisting of the first lower spring member 46 and the second lower spring member 48) is designed to be the same value. The distance in the optical axis direction between the upper spring body portion 30 and the upper support member 32 is referred to as distance L1, and the distance in the optical axis direction between the lower spring body portion 50 and the lower support portion 52 is referred to as distance L2. Here, the equation L1=L2 is given if the gravity is ignored. Thus, the lens holder 22 is supported in a suspended and freely movable manner in the upward and downward direction between the upper support portion 32 and the lower support portions 52 by the center between the upper support portion 32 and the lower support portions 52 being positioned in line with the center between the upper spring body portion 30 and the lower spring body portions 50.

In this embodiment, when a forward electric current flows through the coil 20, an upward force is generated, and the lens holder 22 moves upward against the biasing force of the upper spring member 14. When a reverse electric current flows through the coil 20, a downward force is generated, and the lens holder 22 moves downward against the biasing force of the lower spring members 24.

Figure 3:
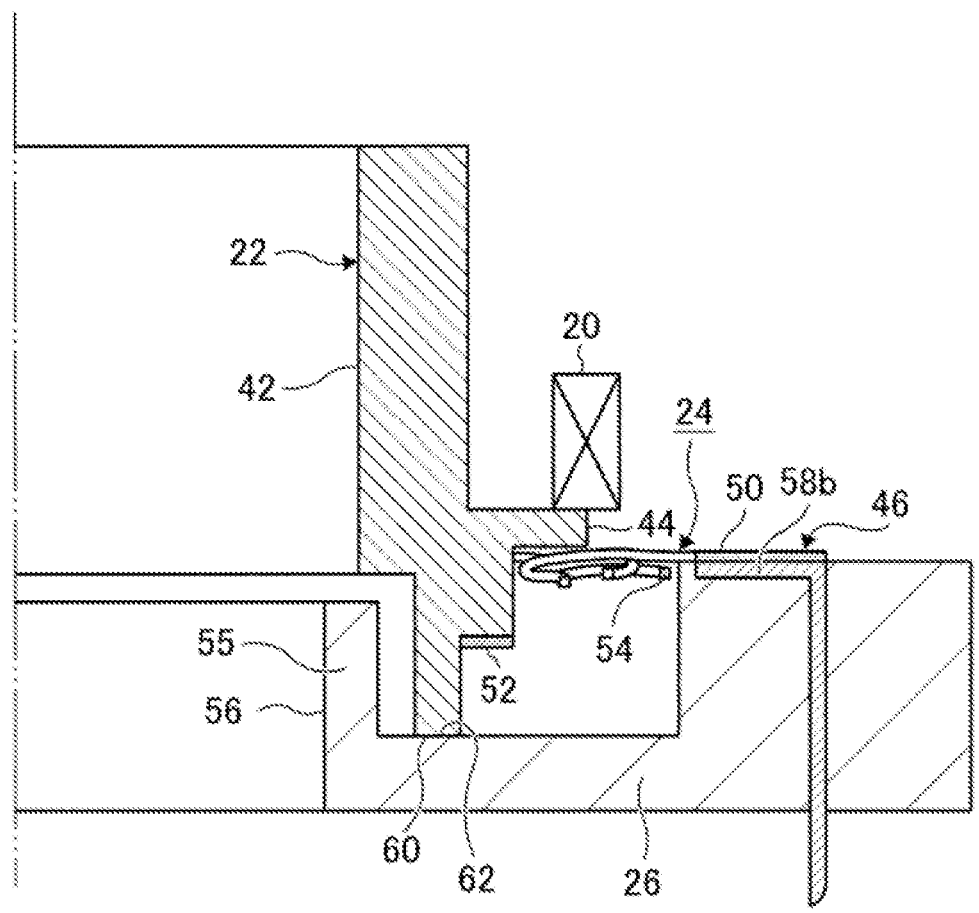
FIG. 3 is a cross-sectional view of the lens driving device in a state before the upper spring member is attached according to one embodiment of the present invention.
Figure 4:
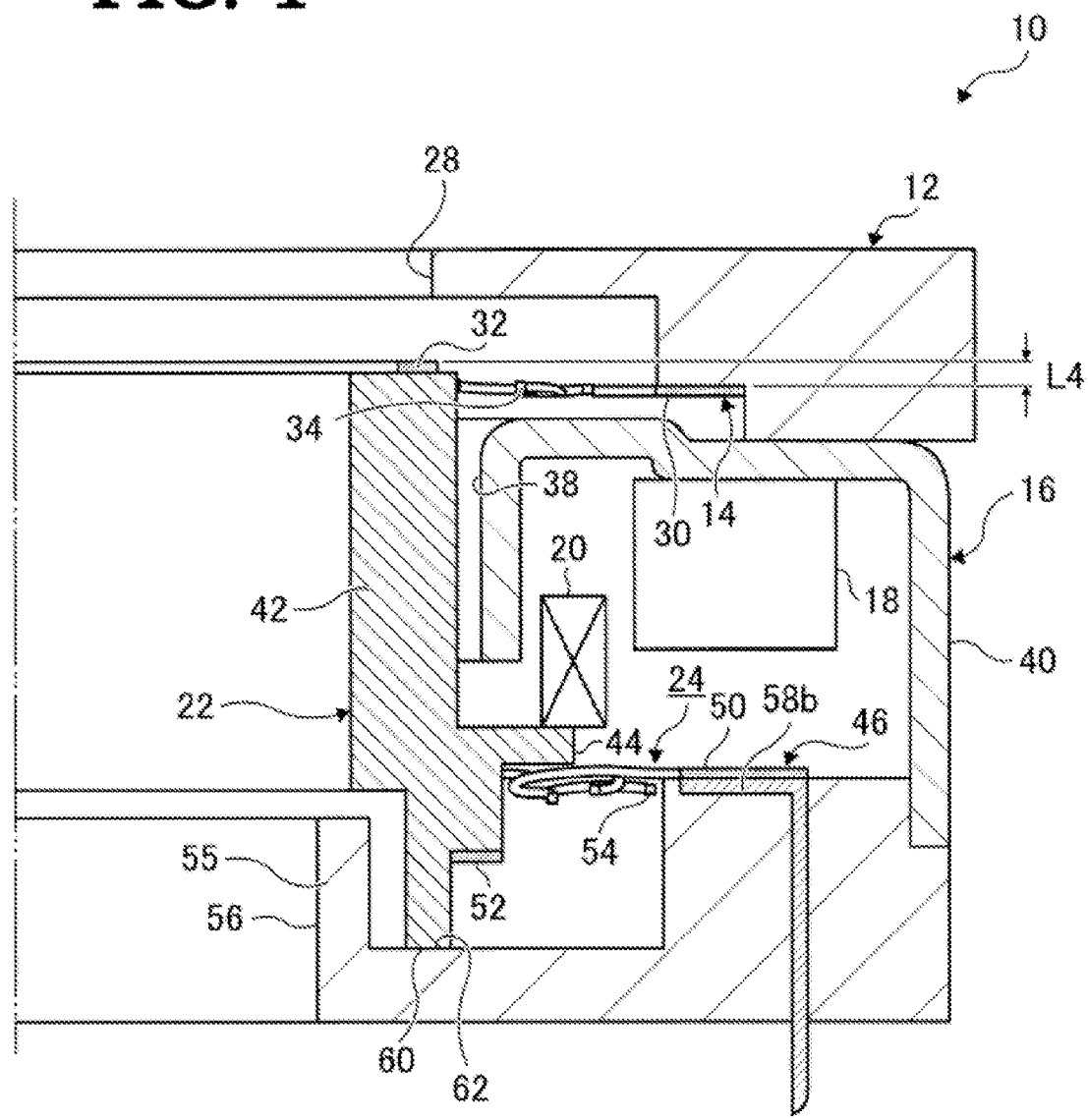
FIG. 4 is a cross-sectional view of the lens driving device in a state after the upper spring member is attached according to one embodiment of the present invention.

The supporter 26 has an abutment surface 62 to which an abutment end 60, which is the lower most end of the lens holder 22, moves against the biasing force of the lower spring members 24 and abuts when the lens holder 22 is supported by only the lower spring members 24 (or the upper spring member 14 is not assembled yet), as shown in FIGS. 3, 4. The abutment surface 62, in this embodiment, is formed at the upper surface of the supporter (base) 26 around the external peripheral of the protrusion 55. As shown in FIG. 2, in this embodiment, the distance L3 in the optical axis direction between the abutment end 60 and the abutment surface 62 at an initial state of no electric current flowing through the coil 20 is designed to be smaller than the distances L1 or L2. As shown in FIG. 4, when the abutment end 60 of the lens holder 22 abuts against the abutment surface 62 of the supporter 26, the distance L4 in the optical axis direction between the upper spring body portion 30 and the upper support portion 32 is a positive value since L4=L1−L3, thus the upper support member 32 is positioned at more upward position than the upper spring body portion 30 in the optical axis direction. Accordingly, the upper support member 32 of the upper spring member 14 exhorts a downward biasing force to the lens holder 22.

A manufacturing method of the lens driving device 10 is explained hereinafter. First of all, the lower support portions 52 of the lower spring members 24 is attached and fixed to the lens holder 22 to which the coil 20 is assembled as shown in FIG. 3. The lower spring body portion 50 of the lower spring member 24 is attached and fixed to the supporter 26 to which the joining members 58a-58d are insert molded.

At the same time, the frame 12, the upper spring member 14, the yoke 16, and the magnets 18 are assembled together as one assembly. More precisely, the magnets 18 are fixed at the four corners of the yoke 16, the upper spring body portion 30 of the upper spring member 14 is fixed to the frame 12, and then the frame 12 and the yoke 16 are assembled and fixed together.

Thereafter, the abutment end 60 of the lens holder 22 abuts the abutment surface 62 of the supporter 26 against the biasing force of the lower spring members 24. This abutment is carried out by pressing the lens holder 22 downward with making use of a jig or other things. Since the abutment end 60 abuts against the abutment surface 62 of the supporter 26, during the assembling process, the lens holder 22 is stably supported on the supporter 26 without the lens holder 22 being inclined with regard to the supporter 26.

Then, as shown in FIG. 4, the one assembly consisting of the frame 12, the upper spring member 14, the yoke 16, and the magnets 18 is assembled to the supporter 26 with the abutment end 60 of the lens holder 22 abutting against the abutment surface 62 of the supporter 26, thus the yoke 16 and the supporter 26 is fixed together. In this case, the lower surface of the upper support portion 32 of the upper spring member 14 or the upper end surface of the lens holder 22, or both, is coated with an adhesive, the lens holder 22 and the upper support portion 32 are fixed together by means of the adhesive. The adhesive has, for example, a thermosetting property, and eventually fixes the lens holder 22 and the upper support portion 32 of the upper spring member 14 by heat curing. With this moment, the upper support portion 32 of the upper spring member 14 is not pressed by a jig.

In this state, the upper support portion 32 of the upper spring member 14 is exhorted a downward biasing force by its spring force itself since the distance L4=L1−L3, as explained before. In other words, the upper support portion 32 do not float upward from the lens holder 22, thus, the upper support portion 32 and the lens holder 22 are firmly attached together without being pressed by the jig. Therefore, an almost uniform pressure is applied between the lens holder 22 and the upper support portion 32 of the upper spring member 14 by the force of the springs only, thus the attachment between the lens holder 22 and the upper support portion 32 can be enhanced.

After curing the adhesive in the state described above, the downward pressing force exhorted to the lens holder 22 is removed, as shown in FIG. 2, then the lens holder 22 is movably supported between the upper spring member 14 and the lower spring members 24 so as to move freely in upward and downward direction. The upper support portion 32 of the upper spring member 14 is fixed to the lens holder 22 in a balanced natural state of force since the upper support portion 32 is not forced by a jig when it is assembled. The lens holder 22 is stably supported in a suspended manner with the balanced force, thus the deficiency such as the lens holder 22 being unstably or slantly assembled can be less generated.

The lens holder 22 supports a lens. A lens driving device 10 in which the lens holder 22 holding the lens is installed in a camera device. In the camera device, light input from an imaging target through the lens is detected by an imaging sensor. A controller which is provided in the camera device calculates a movement amount of the lens for focusing on the imaging target. The controller controls and applies the any of forward and reverse electric current through the coil 20 via the joining members 58b, 58d so that the electric current corresponds to the movement amount of the lens. When the electric current is applied to the joining members 58b, 58d, electric current flows through one joining member 58b, the first lower spring member 46, the coil 20, the second lower spring member 48, and the other joining member 58d. When the forward electric current is applied to the coil 20, a magnetic flux generated between the magnets 18 and the coil 20 generates an upward force applied to the coil 20. When the upward force is applied to the coil 20, the lens together with the coil 20 and the lens holder 22 moves against the force of the upper spring member 14, thus the lens is focused on the imaging target located near the camera device. In contrast, when the reverse electric current is applied to the coil 20, a magnetic flux generated between the magnets 18 and the coil 20 generates a downward force applied to the coil 20. When the downward force is applied to the coil 20, the lens together with the coil 20 and the lens holder 22 moves against the force of the lower spring member 24, thus the lens is focused on an imaging target located far from the camera device.

An alternative embodiment is described hereinafter. In the previous embodiment, the upper spring member 14 and the lower spring member 24 have the same spring constant value. However, different spring constant values can be employed for the upper spring member 14 and for the lower spring member 24. In the case that the different spring constant values are employed, the initial position of the lens holder 22 can be different. For example, in the case that the spring constant value of the upper spring member 14 is designed to be smaller than the spring constant value of the lower spring member 24, the initial position of the lens holder 22 is lower than the position of the case employing the same spring constant value. In this case of the above, movement of the lens holder 22 to the position for focusing on infinite can be carried out quickly without much consumption of electricity.

The upper spring member 14 and the lower spring member 24 are formed as flat sheet springs so that the upper spring body portion 30, the upper support portion 32, and the upper connecting portions 34 are positioned in the same one plane while the lower spring body members 50, the lower support portions 52, and the lower connecting portions 54 are positioned in another same plane when the upper and the lower spring members 14, 24 are in the non-biased state. The present invention is not limited to the above, the upper spring body portion 30 and the upper support portion 32, as well as the lower spring body portions 50 and the lower support portions 52 can be positioned in the different planes in upward and downward direction in the non-biased state. Regarding the upper spring member 14 and/or the lower spring member 24, by differing the position in upward and downward direction of the upper and the lower spring body members 30, 50 and the upper and the lower support portions 32, 52, the initial position of the lens holder 22 can be varied. In this case, it can be possible to exhort a downward biasing force to the lens holder 22 without the distance L3 between the abutment end 60 and the abutment surface 62 being designed to be less than the distance L1 or L2. Further, in the state that the abutment end 60 of the lens holder 22 abuts against the abutment surface 62 of the supporter 26, it can be possible to exhort a downward biasing force to the lens holder 22 without the distance L4 between the upper spring body portion 30 and the upper support portion 32 of the upper spring member 14 being a positive value.

For example, in the initial state of no electric current flowing through the coil 20, it can be possible to be designed that the difference of the distance L1 from the upper spring body portion 30 to the upper support portion 32 of the upper spring member 14 and the distance L4 from the abutment surface 62 to the lens holder 22 may be larger than the distance from the upper spring body portion 30 to the upper support portion 32 of the upper spring member 14 in the non-biased state.

It can be possible to be designed that the distance L4 from the upper spring body portion 30 to the upper support portion 32 of the upper spring member 14 in the state of the lens holder 22 abutting against the abutment surface 62 may be larger than the distance from the upper spring body portion 30 to the upper support portion 32 of the upper spring member 14 in the non-biased state.

In any of the above cases, the upper spring member 14 is deformed, in the state of the lens holder 22 abutting against the abutment surface 62, so that the relative position of the upper support portion 32 with regard to the upper spring body portion 30 of the upper spring member 14 is higher than the relative position of the upper support portion 32 with regard to the upper spring body portion 30 in the non-biased state. Therefore, the upper support portion 32 of the upper spring member 14 exhorts a downward biasing force to the lens holder 22 in the state of the lens holder 22 abutting the abutment surface 62.

In the above embodiment, the abutment of the abutment end 60 of the lens holder 22 against the abutment surface 62 of the supporter 26 is carried out by pressing the lens holder 22 by making use of the jig. However, the abutment can be also carried out e.g. by applying a reverse electric current through the coil 20. Namely, after the coil 20 and the lower spring member 24 are electrically connected, then the coil 20 and the magnets 18 are fixedly assembled or pre-assembled together beforehand assembling the upper spring member 24 into this assembly, thus the lens holder can be moved downward by applying a reverse electric current to the coil 20, thus the abutment end 60 abut against the abutment surface 62.

Further, in the above embodiment, the abutment end 60 of the lens holder 22 is formed as the lower most end of the lens holder 22. However, the present invention is not limited to the above, the abutment end 60 may be formed at any other portion of the lens holder 22. The abutment surface 62 is formed on the supporter 26 in the above embodiment, however, the abutment surface 62 may be formed on other members.

In the above embodiment, during the assembling process, the assembly composed of the frame 12, the upper spring member 14, the yoke 16, and the magnets 18 is assembled to the lens holder 22 after the lens holder 22 is pressed by the jig. However, it is also possible that the assembly is firstly assembled and fixed, and thereafter, the lens holder 22 may be pressed.

In the above embodiment, the assembly composed of the frame 12, the upper spring member 14, the yoke 16, and the magnets 18 is used. However, it is also possible that firstly the assembly of the yoke 16 and the magnets 18 are assembled and fixed to the lens holder 22 and thereafter the assembly of the frame 12 and the upper spring member 14 is assembled and fixed to the lens holder 22.

It may be possible that the one portion of the device is turned upside down, and that the lens holder 22 abuts against an abutment surface formed on the yoke 16 by exhorting an upward biasing force of the lower spring member 24 to the lens holder 22 to fix the lower spring member 24 with the lens holder 22.

In the above embodiment, the upper spring member 14 is fixed on the yoke 16 by its upper spring body portion 30 being fixed in a mounting part which is convexed upward at the lower surface of the frame 12, and by the frame 12 being fixed onto the top wall 36 of the yoke 16. It may be possible that the upper spring body portion 30 is directly fixed onto the top wall 36 of the yoke 16 or is held and fixed between the top wall 36 and the frame 12. When the lens holder 22 is located at the lowest position and is in abut against the abutment surface 62, the upper support member 32 of the upper spring member 14 is positioned higher than the upper spring body portion 30 (top wall 36) by the distance L4, thus the yoke 16 is not obstacle to the movement of the upper spring member 14. If so, the upper spring body portion 30 can be fixed previous to the fixation of the upper support portion 32. In this case, the upper spring body portion 30 is fixed at one process, therefore, the number of manufacturing process can be reduced.

The invention claimed is:

1. A lens driving device comprising:
   a lens holder for supporting a lens;
   a coil mounted on the lens holder;
   at least one magnet disposed around the coil;
   a first spring member and a second spring member which support the lens holder at the both sides of the lens holder in the optical axis direction of the lens so that the lens holder moves freely in the both directions of the optical axis of the lens in an initial state in which no electric current flows through the coil; and
   an abutment surface to which the lens holder abuts when the lens holder moves toward the first spring member against a biasing force of the first spring member; wherein
   the lens holder is exhorted a biasing force by the second spring member from the side of the second spring member to the side of the first spring member in the optical axis direction when the lens holder abuts against the abutment surface.

2. The lens driving device according to claim 1, wherein each of the first spring member and the second spring member includes: a spring body portion to be fixed on a peripheral portion around the lens holder; a support portion to be fixed to the lens holder; and a connecting portion connecting the spring body portion with the support portion;
   the difference of the distance in the optical axis direction from the spring body portion to the support portion of the second spring member and the distance in the optical axis direction from the abutment surface to the lens holder in the initial state in which no electric current flows through the coil is larger than the distance in the optical axis direction from the spring body portion to the support portion of the second spring member in a non-biased state.

3. The lens driving device according to claim 2, wherein the spring body portion and the support portion of the second spring member is positioned on the same plane in the non-biased state,
   the distance in the optical axis direction between the lens holder and the abutment surface is smaller than the distance in the optical axis direction between the spring body portion and the support portion in the initial state in which no electric current flows through the coil.

4. The lens driving device according to claim 1, wherein each of the first spring member and the second spring member includes: a spring body portion to be fixed on a peripheral portion around the lens holder; a support member to be fixed to the lens holder; and a connecting portion connecting the spring body portion with the support portion;
   the distance in the optical axis direction from the spring body portion to the support portion of the second spring member in the state in which the lens holder abuts against the abutment surface is larger than the distance in the optical axis direction from the spring body portion to the support portion of the second spring member in a non-biased state.

5. The lens driving device according to claim 4, wherein the spring body portion and the support portion of the second spring member is positioned on the same plane in the non-biased state while the support portion is positioned at a side being directed toward the second spring member in the optical axis direction with regard to the spring body portion in the state in which the lens holder abuts against the abutment surface.

6. A camera device comprising:
a lens driving device;
a lens held by a lens holder; and
an image sensor being provided about the optical axis of the lens; wherein
the lens driving device includes:
   the lens holder for supporting the lens;
   a coil mounted on the lens holder;
   at least one magnet disposed around the coil;
   a first spring member and a second spring member which support the lens holder at the both sides of the lens holder in the optical axis direction of the lens so that the lens holder moves freely in the both directions of the optical axis of the lens in an initial state in which no electric current flows through the coil; and
   an abutment surface to which the lens holder abuts when the lens holder moves toward the first spring member against a biasing force of the first spring member; wherein
   the lens holder is exhorted a biasing force by the second spring member from the side of the second spring member to the side of the first spring member in the optical axis direction when the lens holder abuts against the abutment surface.

7. An electronic apparatus being equipped with a camera device, the camera device including:
a lens driving device;
a lens held by a lens holder; and
an image sensor being provided about the optical axis of the lens; wherein
the lens driving device further includes:
   the lens holder for supporting the lens;
   a coil mounted on the lens holder;
   at least one magnet disposed around the coil;
   a first spring member and a second spring member which support the lens holder at the both sides of the lens holder in the optical axis direction of the lens so that the lens holder moves freely in the optical axis direction of the lens in an initial state in which no electric current flows through the coil; and
   an abutment surface to which the lens holder abuts when the lens holder moves toward the first spring member against a biasing force of the first spring member; wherein
   the lens holder is exhorted a biasing force by the second spring member from the side of the second spring member to the side of the first spring member in the optical axis direction when the lens holder abuts against the abutment surface.

8. A method for manufacturing a lens driving device, the method comprising:
   fixing a first spring member which supports a lens holder, which holds a lens, at one side of the lens holder in the optical axis direction of the lens;
   making the lens holder abut to an abutment surface against a biasing force of the first spring member; and
   in the state in which the lens holder abuts to the abutment surface against the biasing force of the first spring member, fixing a second spring member, which supports the lens holder at the other side of the lens holder in the optical axis direction of the lens, to the lens holder with the second spring member being exhorted a biasing force from the other side of the lens holder.

9. The method according to claim 8, wherein
the lens driving device includes:
   a coil mounted on the lens holder; and
   at least one magnet disposed around the coil;
   the lens holder abuts against the abutment surface by flowing an electric current through the coil.

10. The method according to claim 8, wherein the abutment of the lens holder against the abutment surface is carried out by pressing the lens holder.

* * * * *